United States Patent
Benmokhtar et al.

(10) Patent No.: US 11,840,276 B2
(45) Date of Patent: Dec. 12, 2023

(54) METHOD FOR DETECTING FAULTS RELATED TO WHEELS OF A MOTOR VEHICLE IN A DRIVING SITUATION

(71) Applicant: Valeo Schalter und Sensoren GmbH, Bietigheim-Bissingen (DE)

(72) Inventors: Rachid Benmokhtar, Bobigny (FR); Salma Moujtahid, Bobigny (FR)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 0 days.

(21) Appl. No.: 17/641,588

(22) PCT Filed: Aug. 27, 2020

(86) PCT No.: PCT/EP2020/073964
§ 371 (c)(1),
(2) Date: Mar. 9, 2022

(87) PCT Pub. No.: WO2021/047916
PCT Pub. Date: Mar. 18, 2021

(65) Prior Publication Data
US 2022/0297754 A1     Sep. 22, 2022

(30) Foreign Application Priority Data
Sep. 13, 2019   (DE) .................. 10 2019 124 655.5

(51) Int. Cl.
*B62D 15/02*  (2006.01)
*B60W 30/12*  (2020.01)
(Continued)

(52) U.S. Cl.
CPC .......... *B62D 15/025* (2013.01); *B60W 30/12* (2013.01); *B60W 50/038* (2013.01); *G07C 5/0816* (2013.01)

(58) Field of Classification Search
CPC .................... B60W 30/12; B60W 50/038
See application file for complete search history.

(56) References Cited

U.S. PATENT DOCUMENTS

| | | | |
|---|---|---|---|
| 9,984,296 B2 | 5/2018 | Santamaria et al. | |
| 2005/0080543 A1* | 4/2005 | Lu .................. | B60G 17/0195 |
| | | | 701/91 |

(Continued)

FOREIGN PATENT DOCUMENTS

| | | |
|---|---|---|
| CN | 102343912 A | 2/2012 |
| DE | 102010061442 A1 | 9/2011 |

(Continued)

OTHER PUBLICATIONS

International Search Report and Written Opinion in corresponding International Application No. PCT/EP2020/073964, dated Oct. 28, 2020 (12 pages).

(Continued)

*Primary Examiner* — Jeff A Burke
*Assistant Examiner* — Jerrod Irvin Davis
(74) *Attorney, Agent, or Firm* — Osha Bergman Watanabe & Burton LLP

(57) ABSTRACT

The subject matter of the invention is a method for detecting faults related to wheels of a motor vehicle in a driving situation, comprising: —a step ($S_1$) of automatically determining a first series of corrective steering wheel angles applied successively to force the vehicle to follow a path parallel to a first rectilinear portion of a traffic lane; —a step ($S_2$) of automatically detecting, from the corrective steering wheel angles of the first series, the presence of a fault affecting a pair of steering wheels of the vehicle; and, optionally: —a step ($S_3$) of estimating a type of fault associated with the detected fault, a step ($S_4$) of identifying the steering wheel of the pair of wheels affected by the fault; and —a step ($S_5$) of generating a warning message for the (Continued)

attention of the driver of the motor vehicle, the message including the estimated type of fault and the wheel identified as having the fault.

9 Claims, 3 Drawing Sheets

(51) Int. Cl.
*B60W 50/038* (2012.01)
*G07C 5/08* (2006.01)

(56) References Cited

U.S. PATENT DOCUMENTS

| | | |
|---|---|---|
| 2007/0208472 A1 | 9/2007 | Naruse et al. |
| 2013/0173115 A1 | 7/2013 | Gunia et al. |
| 2013/0253767 A1 | 9/2013 | Lee et al. |
| 2014/0081542 A1* | 3/2014 | Yao ............... B60W 40/105 701/124 |
| 2015/0005982 A1* | 1/2015 | Muthukumar ........ B60T 8/1725 701/1 |
| 2017/0088176 A1 | 3/2017 | Tamura et al. |
| 2017/0103268 A1* | 4/2017 | Santamaria ............ G06T 7/246 |
| 2017/0136842 A1 | 5/2017 | Anderson et al. |
| 2018/0023951 A1 | 1/2018 | Seo et al. |
| 2018/0162411 A1* | 6/2018 | Alvarez Jaime ....... G07C 5/085 |
| 2019/0063913 A1* | 2/2019 | Leone ................... G01M 17/06 |
| 2021/0114659 A1* | 4/2021 | Miyashita ............ G05D 1/0061 |

FOREIGN PATENT DOCUMENTS

| | | | |
|---|---|---|---|
| DE | 102013013317 B3 | 2/2015 | |
| DE | 102014200608 A1 | 7/2015 | |
| DE | 102015225141 A1 | 6/2017 | |
| JP | 2004224172 A | 8/2004 | |
| KR | 20200041399 A | * 10/2018 | ........... B60W 30/12 |
| WO | 2010/107344 A1 | 9/2010 | |
| WO | 2015/082256 A1 | 6/2015 | |

OTHER PUBLICATIONS

German Search Report issued in corresponding German Application No. 10 2019 124 655.5, dated Apr. 29, 2020 (6 pages).
Office Action issued in Chinese Application No. 202080064334.9 dated May 23, 2023 (20 pages).

* cited by examiner

METHOD FOR DETECTING FAULTS RELATED TO WHEELS OF A MOTOR VEHICLE IN A DRIVING SITUATION

TECHNICAL FIELD

The present invention generally relates to the detection of faults related to wheels of a motor vehicle, and more particularly to a method allowing the detection of such faults during vehicle driving situations.

As will appear later, what is understood by fault related to wheels is any fault related to the state of the wheels or to their axles.

TECHNOLOGICAL BACKGROUND

It is known that a fault in the wheels of a motor vehicle, such as a fault in alignment or deflation of the tires, can be the cause of premature wear of the tires but also induce problems relating to stability or control and wear of the steering system during the phases of driving the vehicle. Faults related to the wheels can also be the cause of overconsumption of fuel for the motor vehicle.

In addition, an increasing number of motor vehicles are equipped with partial automation systems or advanced driver assistance systems, in particular systems performing, in place of the driver, the lateral control of the vehicle. In particular, so-called traffic lane keeping or guiding systems are known which make it possible to determine the traffic lanes, in particular by detecting the marking lines on the ground, and then to act on the steering system of the motor vehicle in order to allow it to follow a path according to the traffic lanes. In practice, for a functionality of keeping the vehicle in its traffic lane, such systems estimate in real time corrective steering wheel angles which are applied to enable the vehicle to follow a predefined path, parallel to the traffic lane. It will therefore be appreciated that wheel alignment or tire deflation faults can negatively impact the performance of these assistance systems in the lateral control of the vehicle, in terms of stability, safety and behavior.

However, such faults are generally detected and corrected only during maintenance inspections of the motor vehicle. Thus, the alignment procedure is a standard procedure in automotive maintenance during which the motor vehicle is placed on an inspection bench or platform equipped with dedicated equipment making it possible to detect any alignment faults, conventionally by measuring with precision the different angles involved in the alignment of the wheels, in particular:
- the camber angle, corresponding to the angle formed by the inclination of a wheel with the vertical,
- the toe-out/toe-in angle, corresponding to the difference between the direction of the wheels and the longitudinal axis of the vehicle,
- and the caster angle, corresponding to the angle formed between the vertical and the pivot axis of the wheel, seen from the side, that is to say measured in the longitudinal direction.

These angles are then adjusted so that the wheels of a vehicle are parallel to one another and perpendicular to the plane of the road.

It follows from the foregoing that there is a need to be able to detect as soon as possible, and during the driving phases of a vehicle, the presence of a fault related to the wheels so as to alert the driver of the need to quickly carry out a maintenance operation.

Document US 2013/0253767 discloses a method and a system for self-diagnosing possible malfunctions linked to a vehicle by using a lateral control assistance system fitted to the motor vehicle, and for alerting the driver accordingly. More specifically, the lateral control assistance system conventionally comprises a path generator capable of generating a desired path for the vehicle so that the latter keeps in a traffic lane and a steering controller capable of providing the steering members with steering corrections to follow the desired path. The system further comprises a path predictor for predicting a path actively followed by the vehicle and a virtual dynamics module modeling the anticipated path of the vehicle resulting from the steering corrections. If the predicted path and the anticipated path show too great differences reflecting a possible malfunction, a diagnostic system is then activated to identify whether the cause of the possible malfunction is linked to environmental conditions (strong wind for example), to mechanical faults in the components of the steering system (for example a fault related to wheels or to the positioning of an angle sensor), or to faults related to the positioning of the sensors used to detect the traffic lanes. In this system, however, it is not possible to determine precisely which of the two left or right wheels of the pair of steered wheels of the vehicle actually has a fault, nor to specify whether the type of fault relates to deflation of tires or to a wheel alignment fault.

SUMMARY OF THE INVENTION

The present invention aims to overcome the limitations of the prior art.

More specifically, the subject of the present invention is a method for detecting faults related to wheels of a motor vehicle in a driving situation, comprising:
- a first step of automatically determining a first series of corrective steering wheel angles applied successively during a first time window of driving said motor vehicle on a first portion of a substantially rectilinear traffic lane, said corrective steering wheel angles being applied so that said vehicle follows a path parallel to said first traffic lane portion;
- a step of automatically detecting the presence of a fault affecting a pair of steered wheels of the motor vehicle, from the corrective steering wheel angles of the first series; and, optionally,
- a step of estimating a type of fault associated with the fault whose presence has been detected;
- a step of identifying the steered wheel of said pair of wheels affected by said fault; and
- a step of generating a warning message for the attention of the driver of the motor vehicle, said message comprising the estimated type of fault and the wheel identified as having the fault.

According to particular embodiments:
- the automatic detection step can comprise a step of calculating an average and a standard deviation on the corrective steering wheel angles of the first series;
- the steered wheel affected by said fault can then be identified from the sign of the average calculated in the automatic detection step;
- the step of estimating a type of fault preferably comprises a step of calculating time derivatives of the corrective steering wheel angles of said first series, the type of fault being estimated on the basis of a comparison of an average of the time derivatives with respect to zero;
- in another possible embodiment, the method comprises, following a detection of the presence of a fault resulting from the automatic detection step, a second step of automatically determining a second series of corrective steering wheel angles successively applied during a second time window of driving said motor vehicle on a second traffic lane portion of curved profile, said corrective steering wheel angles being applied so that said vehicle follows a path parallel to said second traffic lane portion, and a step of calculating an average on the corrective steering wheel angles of the second series;

the steered wheel affected by said fault is then identified from the sign of the average calculated on the corrective angles of the second series;

the step of estimating a type of fault can comprise a step of calculating the time derivative of the corrective steering wheel angles of said second series, the type of fault being estimated on the basis of a comparison of said time derivative with respect to zero;

in another embodiment, the method can further comprise a step of deactivating an on-board driver assistance system capable of commanding a lateral control of the path of the motor vehicle during an activation phase of said on-board driver assistance system;

said deactivation is for example triggered on the basis of the estimated type of fault;

the corrective steering wheel angles applied are preferably delivered by said on-board driver assistance system during the activation phase of said on-board driver assistance system.

BRIEF DESCRIPTION OF THE DRAWINGS

The invention will be better understood in view of the following description given with reference to the appended figures, in which.

DESCRIPTION OF EMBODIMENT(S)

Figure 1:
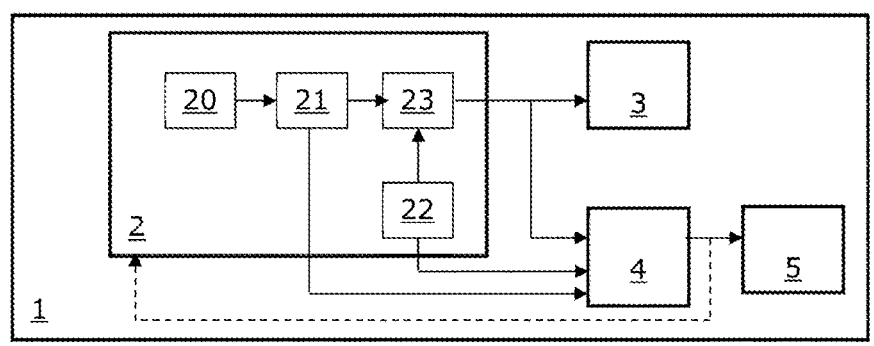
FIG. 1 shows a functional block diagram of a system on board a motor vehicle according to a possible implementation of a method for detecting faults related to the wheels of the vehicle according to the invention.

Possible modes of implementation of a method for detecting faults related to wheels of a motor vehicle according to the invention will now be described, with particular reference to FIG. 1 which represents a functional block diagram, in the nonlimiting context of a motor vehicle 1 equipped with a driver assistance system 2 capable of commanding the lateral control of the path of the motor vehicle.

To keep the motor vehicle 1 in the traffic lane which it takes, the lateral-control driver assistance system 2 conventionally has one or more sensors 20 whose detections will make it possible to determine certain characteristics of this traffic lane, such as the width of the traffic lane, its orientation relative to the vehicle and its curvature, in order to estimate and follow a model of the traffic lane (typically the path formed by following the center of the traffic lane). The sensors used are, for example, cameras, LIDAR sensors, radars or else virtual sensors, or more generally any type of sensor capable of detecting marking lines on the ground. An example of a virtual sensor would be software that would read data acquired by other sensors of the vehicle, which would determine on this basis the position of objects such as other cars or safety rails, and which would deduce therefrom the position of the traffic lane relative to the vehicle. From the information delivered by the sensor or sensors 20, an electronic module 21 of the lateral control system 2 estimates the marking lines on the ground, possibly by data fusion in cases where several sensors capable of detecting marking lines on the ground are used. The system 2 also has a certain amount of information, grouped under the reference 22, such as the speed and/or the acceleration of the motor vehicle 1, and the position of the vehicle provided by an on-board navigation system, such as a GPS system, and/or an on-board high-definition map. On the basis of all of this information, an electronic lateral-control module 23 generates and transmits, to a system 3 for controlling the steering column of the motor vehicle 1, corrective steering wheel angles to be applied so that the motor vehicle 1 automatically follows a path parallel to the traffic lane, generally the center line of this traffic lane. The system 3 then directly applies the angle corrections to the steering wheel that it receives. In other words, the steering wheel of the vehicle, which controls the steered wheels of the vehicle, is automatically turned according to the corrective angle values that it receives.

Figure 2:
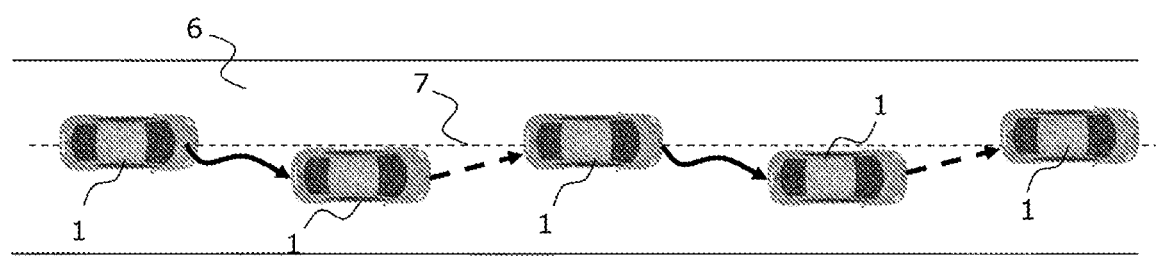
FIG. 2 shows an example of a path followed by a motor vehicle whose wheels have a fault.

The principle of the invention is based on the fact that the main symptom of a fault related to a steered wheel of a motor vehicle is that the vehicle will tend to drift to the right or to the left. This drift is all the more visible when the motor vehicle is driving on a rectilinear road portion. Under these conditions, the lateral-control assistance system 2, when it is activated, will detect these drifts and thus be caused to generate many more corrective steering wheel angles than it should have done for a vehicle whose steered wheels show no fault. This is illustrated schematically in FIG. 2 which shows several successive positions of the motor vehicle 1 driving on a rectilinear traffic lane portion 6. It is noted in this figure that the motor vehicle 1 drifts twice to the right (as illustrated by the arrows in solid lines) while it is supposed to follow the center 7 of this rectilinear traffic lane portion 6. The electronic lateral-control module 23 will in this case, at each drift detected, deliver a corrective steering wheel angle so that the motor vehicle 1 can be recentered on the road portion (as illustrated by the two arrows in dotted lines).

The method for detecting faults related to steered wheels of the motor vehicle according to the invention is based on the analysis of the corrective steering wheel angles which will make it possible, as will be detailed later, not only to automatically detect the presence of a fault while the vehicle is in a driving situation, but also to estimate a type of fault and to identify which of the two left or right steered wheels is affected by the fault.

Figure 3:
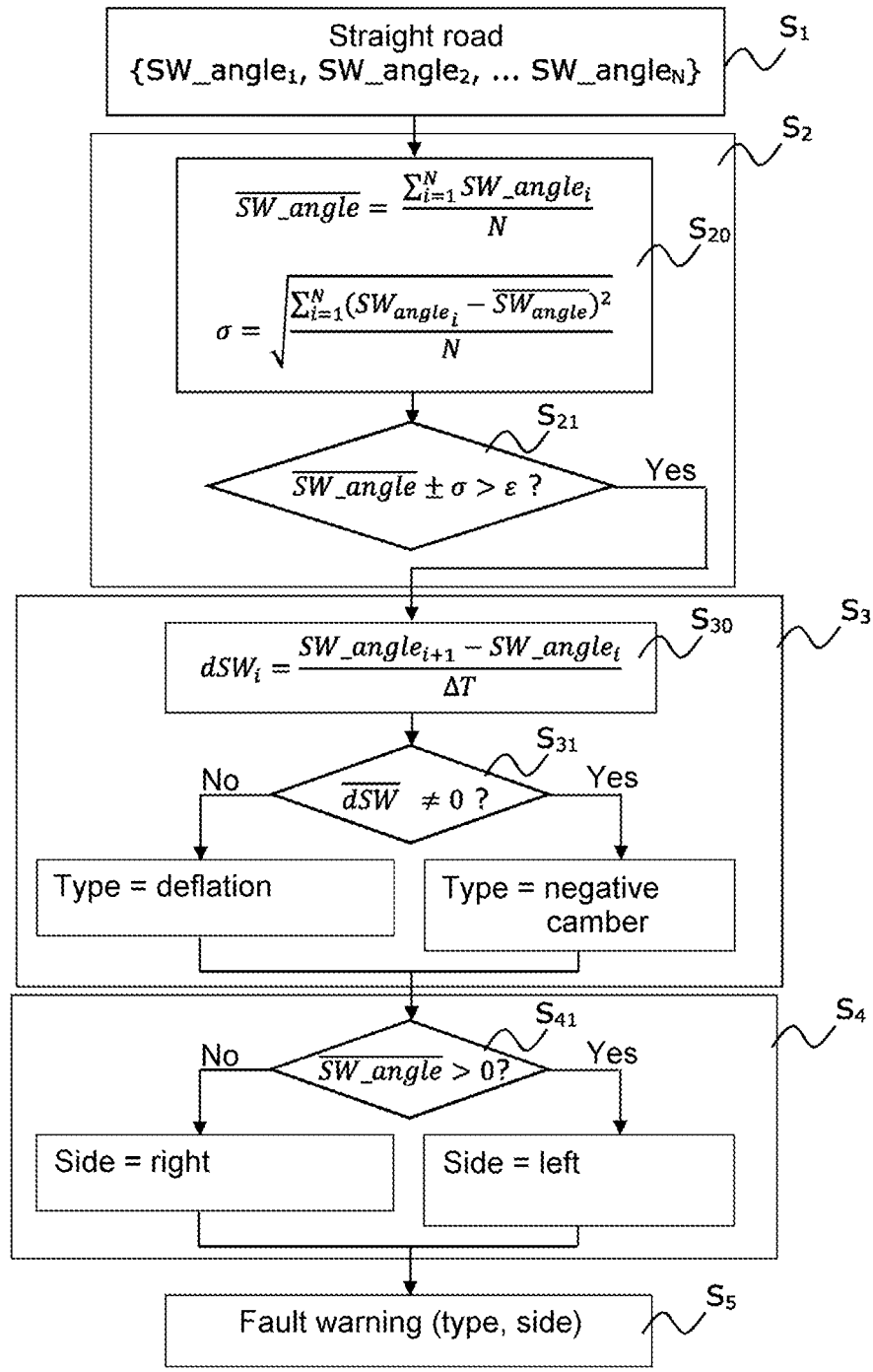
FIG. 3 shows steps that can be implemented according to a first embodiment of a detection method according to the invention.

FIG. 3 illustrates steps of a method for detecting faults related to a right and/or left wheel of a pair of steered wheels of the motor vehicle 1 according to a first possible embodiment according to the invention.

A first step $S_1$ of the method consists in automatically determining a first series of corrective steering wheel angles which are applied successively during a first time window of driving the motor vehicle 1 while the latter is traveling on a first substantially rectilinear traffic lane portion, in order to force the motor vehicle 1 to follow a path parallel to this first traffic lane portion.

As has been seen previously, the corrective angles are here automatically determined by the electronic lateral-control module 23, and can therefore be delivered directly for processing to a module 4 for detecting faults related to the wheels (see FIG. 1). The assistance system 2 is also able, from the information delivered by the electronic module 21 and the information 22 relating to the map and to the speed and/or the acceleration of the vehicle, to identify that the corrective steering wheel angles of this first series are well determined while the motor vehicle is on a rectilinear road portion. A condition prior to triggering step $S_1$ may be to verify that the motor vehicle 1 is driving on a substantially rectilinear road portion, for example by verifying that the radius of curvature of the road does not exceed a certain threshold of curvature, and that this road portion will remain rectilinear long enough to make it possible to collect a succession of corrective angles. It may be considered for example, to give a concrete idea, that the road portion must be substantially rectilinear over approximately 200 meters if the vehicle is moving at a speed of less than 50 km/h, or over approximately 400 meters if the vehicle is moving at a speed of between 50 and 100 km/h, so as to be able to observe the variations in the corrective steering wheel angle and the frequency of the corrections over a time window of approximately 15 seconds.

The corrective steering wheel angles of the first series are then processed by the module 4 for detecting faults related to the wheels during a step $S_2$ for the purpose of automatically detecting the presence of a fault affecting the pair of steered wheels of the motor vehicle. To do this, the module 4 can calculate, during a step $S_{20}$, the average and the standard deviation which are associated with the corrective steering wheel angles of the first series. If $\{SW\_angle_1, SW\_angle_2, \ldots SW\_angle_N\}$ is used to denote the set of N values of corrective steering wheel angles contained in the first series, then the average $\overline{SW\_angle}$ and the standard deviation $\sigma$ are determined according to the following relationships:

$$\overline{SW\_angle} = \frac{\sum_{i=1}^{N} SW\_angle_i}{N}$$

$$\sigma = \left(\sqrt{\frac{\sum_{i=1}^{N} \left(SW_{angle_i} - \overline{SW_{angle}}\right)^2}{N}}\right)$$

The presence of a fault is detected automatically by comparing a linear combination of the average $\overline{SW\_angle}$ and the standard deviation $\sigma$ to the known uncertainty $\varepsilon$ of the assistance system 2. For example, as illustrated by step $S_{21}$ of FIG. 1, the presence of a fault is automatically detected by the fault detection module 4 if the following relationship is fulfilled:

$$\overline{SW\_angle} \pm \sigma > \varepsilon$$

reflecting the fact that the corrective steering wheel angles deviate on average by a value greater than the known uncertainty of the system.

If no fault is detected at this stage, provision can be made to reprogram the automatic reiteration of steps $S_1$ and $S_2$ at a later date, for example one week later.

Otherwise, the method continues with a step $S_3$ of estimating the type of fault associated with the fault whose presence has been detected in step $S_2$, and with a step $S_4$ of identifying the steered wheel of the pair of wheels affected by this fault. It should be noted at this stage that although step $S_4$ is illustrated in FIG. 3 as succeeding step $S_3$, the order of the two steps $S_3$ and $S_4$ can be reversed. These steps $S_3$, $S_4$ can alternatively be carried out in parallel.

To proceed to step $S_3$ of estimating the type of fault, the fault detection module 4 analyzes the rate of variation of the corrective steering wheel angles determined in step $S_1$ by calculating for example, during a calculating step $S_{30}$, the time derivative $dSW_i$ at each instant of the corrective steering wheel angles of the first series, according to the relationships:

$$dSW = \{dSW_1, dSW_2, \ldots dSW_{N-1}\}$$

$$dSW_i = \frac{SW\_angle_{i+1} - SW\_angle_i}{\Delta T}$$

The type of fault can then be estimated on the basis of a comparison (step $S_{31}$) of an average $\overline{dSW}$ of the time derivatives $dSW_i$ with respect to zero. More precisely, if the average $\overline{dSW}$ of the time derivatives $dSW_i$ is equal to zero (corresponding to a constant rate of variation of the corrective steering wheel angles of the first series), then the fault detection module 4 deduces that the type of fault is a deflation of a tire of one of the steered wheels (left branch of the test performed in step $S_{31}$). Otherwise, the fault detection module 4 deduces that the type of fault concerns an alignment problem, and more precisely a negative camber angle (wheel leaning toward the vehicle) for one of the steered wheels (right branch of the test performed in step $S_{31}$).

The steered wheel affected by the fault is identified for its part from the sign of the average $\overline{SW\_angle}$ calculated in step $S_2$ of automatic detection. More precisely, if the sign of the average $\overline{SW\_angle}$ is positive, then the wheel affected by the fault is the left steered wheel (right branch of the test performed in step $S_{41}$). Conversely, if the sign of the average $\overline{SW\_angle}$ is positive, then the wheel affected by the fault is the right steered wheel (left branch of the test performed in step $S_{41}$).

At the end of steps $S_3$ and $S_4$, the detection module 4 can generate a warning message (step $S_5$) for the attention of the driver of the motor vehicle, this message advantageously comprising the type of estimated fault and the wheel identified as having the fault. This message is transmitted for sound and/or visual broadcast on a user interface 5 located in the passenger compartment of the motor vehicle 1 (see FIG. 1).

The module 4 can also decide, depending on the type of fault detected, to deactivate the lateral-control assistance system 2 as indicated by the dotted command in FIG. 1. In particular, if the type of fault is a deflation of a tire for one of the steered wheels, it may be desirable to deactivate the functionalities offered by the lateral control because a deflation of the tire can falsify the calibration of the sensors 20 used by the system 2, and, consequently, automatic path control. A fault linked to the negative camber angle will, on the other hand, have less impact on the performance of the lateral-control assistance system 2, so that it is not necessary to deactivate the system 2 in this case. As a variant, the lateral control by the system 2 can be deactivated as soon as the presence of a fault linked to a wheel has been detected.

Figure 4:
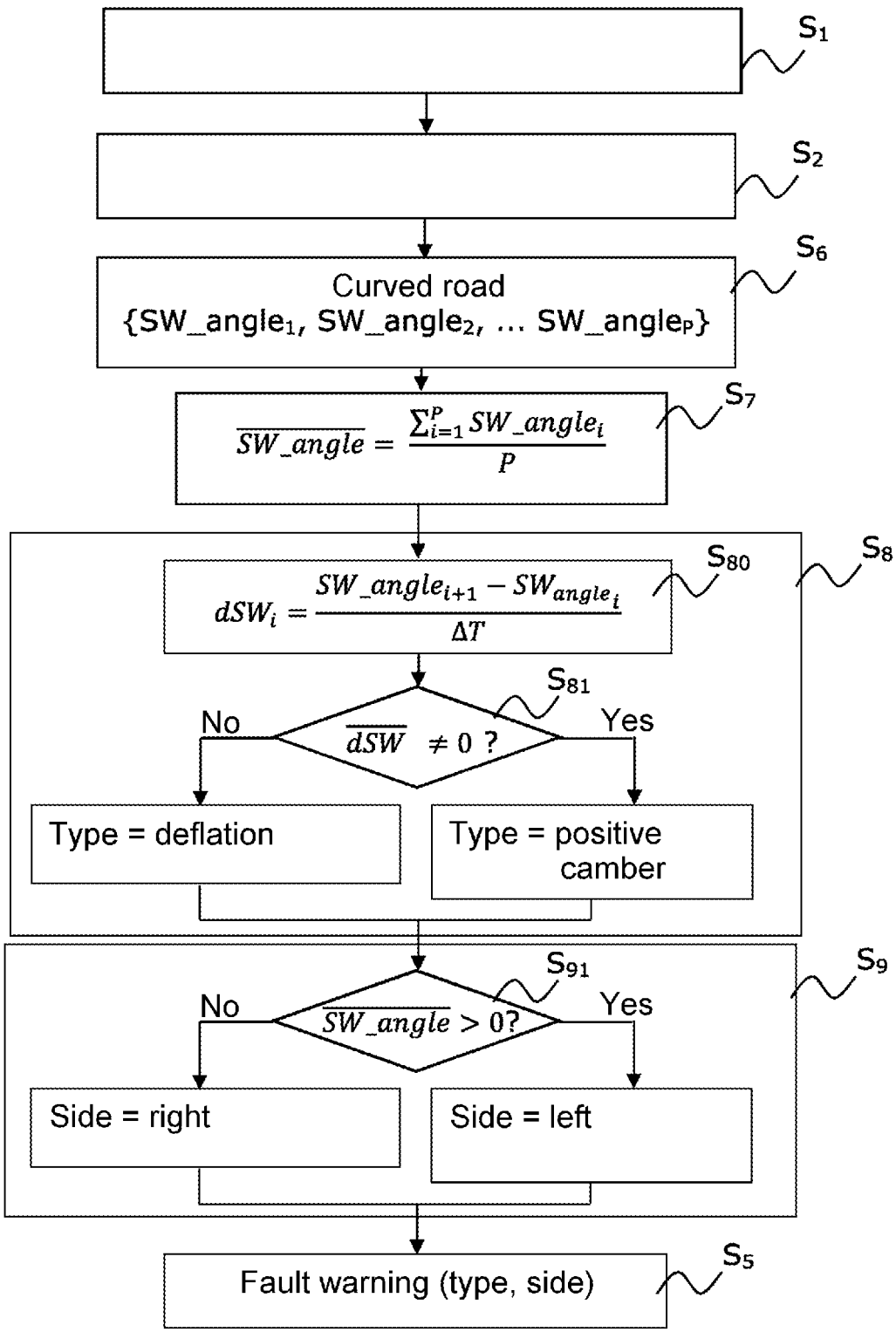
FIG. 4 shows steps that can be implemented according to another embodiment of a detection method according to the invention.

FIG. 4 illustrates steps of a method for detecting faults linked to a right and/or left wheel of a pair of steered wheels of the motor vehicle 1 according to a second possible embodiment in accordance with the invention.

The method begins with the same steps $S_1$ and $S_2$ as those described with reference to FIG. 3, namely the steps enabling the fault detection module 4 to detect the presence of a fault from the first series of corrective steering wheel angles collected while the motor vehicle 1 is moving on a first substantially rectilinear traffic lane portion.

The method of FIG. 4 nevertheless differs from that described in FIG. 3 in that it comprises, in the event that, at the end of step $S_2$, the module 4 has detected the presence of a fault, a second cycle of measurements, carried out this time while the motor vehicle 1 is moving on a second curved traffic lane portion, unlike the first traffic lane portion which was substantially straight. FIG. 4 thus shows, following step $S_2$, a new step $S_6$ of automatic determination of a second series of corrective steering wheel angles successively applied during a second time window of driving the motor vehicle 1 while the latter is traveling on a traffic lane portion with a curved profile, the corrective steering wheel angles being applied so that said vehicle follows a path parallel to this second curved traffic lane portion.

As before, the corrective angles here are automatically determined by the electronic lateral-control module 23, and can therefore be delivered directly for processing to the module 4 for detecting faults linked to the wheels (see FIG. 1). The assistance system 2 is also able, from the information of the electronic module 21 and the information 22 relating to the map and to the speed and/or the acceleration of the vehicle, to identify that the corrective steering wheel angles of this second series are well determined while the motor vehicle is on a curved portion of road. A condition prior to triggering step $S_6$ may be to verify that the portion of road on which the motor vehicle 1 is traveling is indeed of curved profile. It is for example possible to check that the radius of curvature of this portion of road is greater than a predefined curvature threshold, for example set at 1000 meters, and that this portion of road will remain curved long enough to make it possible to collect a succession of corrective angles.

The type of fault and the identification of the wheel having the fault are then determined in a manner similar to steps $S_3$ and $S_4$ described above, except that the calculations performed by the fault detection module 4 now use the corrective steering wheel angles of the second series.

More specifically, the module 4 can calculate, during a step $S_7$, the average of the corrective steering wheel angles of the second series. If $\{SW\_angle_1, SW\_angle_2, \ldots SW\_angle_P\}$ denotes the set of P values of corrective steering wheel angles contained in the second series, then the average $\overline{SW\_angle}$ is determined according to the following relationship:

$$\overline{SW\_angle} = \frac{\sum_{i=1}^{P} SW\_angle_i}{P}$$

The method continues with a step $S_8$ of estimation of the type of fault associated with the fault whose presence was detected in step $S_2$, and by a step $S_9$ of identification of the steered wheel of the pair of wheels affected by this fault. Here again, although step $S_9$ is shown in FIG. 3 as succeeding step $S_8$, the order of the two steps $S_8$ and $S_9$ can be reversed. These steps $S_8$, $S_9$ can alternatively be carried out in parallel.

These steps $S_8$ and $S_9$ are very similar to steps $S_3$ and $S_4$ of the embodiment of FIG. 3.

Thus, to proceed to step $S_8$ for estimating the type of fault, the fault detection module 4 analyzes the rate of variation of the corrective steering wheel angles determined in step $S_6$ by calculating for example, during a step $S_{80}$ of calculation, the time derivative $dSW_i$ at each instant of the corrective steering wheel angles of the second series, according to the relationships:

$$dSW = \{dSW_1, dSW_2, \ldots dSW_{P-1}\}$$

$$dSW_i = \frac{SW\_angle_{i+1} - SW\_angle_i}{\Delta T}$$

The type of fault can then be estimated on the basis of a comparison (step $S_{81}$) of the average $\overline{dSW}$ of the time derivatives $dSW_i$ relative to zero. More precisely, if the average $\overline{dSW}$ of the time derivatives $dSW_i$ is equal to zero (corresponding to a constant rate of variation of the corrective steering wheel angles of the second series), then the fault detection module 4 deduces that the type of fault is a deflation of a tire of one of the steered wheels (left branch of the test performed in step $S_{81}$). Otherwise, the fault detection module 4 deduces that the type of fault concerns an alignment problem, and more precisely a positive camber angle (wheel leaning toward the outside of the vehicle) for one of the steered wheels (right branch of the test performed in step $S_{81}$).

The steered wheel affected by the fault is identified for its part from the sign of the average $\overline{SW\_angle}$ calculated in step $S_7$. More precisely, if the sign of the average $\overline{SW\_angle}$ is positive, then the wheel affected by the fault is the left steered wheel (right branch of the test performed in step $S_{91}$). Conversely, if the sign of the average $\overline{SW\_angle}$ is positive, then the wheel affected by the fault is the right steered wheel (left branch of the test performed in step $S_{91}$).

At the end of steps $S_8$ and $S_9$, there is found, as in the case of FIG. 3, step $S_5$ during which the detection module 4 will generate a warning message for the attention of the driver of the motor vehicle, this message advantageously comprising the type of fault estimated in step $S_8$, and the wheel identified in step $S_9$ as having the fault, this message being transmitted for sound and/or visual broadcast on the user interface 5 located in the passenger compartment of the motor vehicle 1 (see FIG. 1).

The module 4 can also decide, once the presence of a fault has been detected, or depending on the type of fault detected, to deactivate the lateral-control assistance system 2, as indicated by the dotted command in FIG. 1. In particular, if the type of fault is a deflation of a tire for one of the steered wheels, it may be desirable to deactivate the functionalities offered by the lateral control because a deflation of the tire can falsify the calibration of the sensors 20 used by the system 2, and, consequently, automatic path control.

The two previous methods have been described as being alternative methods, comprising only steps $S_1$ and $S_2$ in common. In a variant that is not shown, provision can also be made to combine these two methods. For example, there can be provision, following the detection in step $S_2$ of the method shown in FIG. 3, to also initiate in addition steps $S_3$ and $S_4$ and, as soon as the motor vehicle 1 drives on a traffic lane portion of curved profile, to carry out steps S6 to S9 described in relation to the method of FIG. 4.

The two methods whose steps are illustrated in FIGS. 3 and 4, or their combination, have been described in the nonlimiting case where the motor vehicle 1 is equipped with the lateral-control assistance system 2 (case of FIG. 1). The advantage in this case is twofold: on the one hand, it is possible to precisely identify a wheel having a fault in a driving situation of the vehicle by directly using measurements of corrective steering wheel angles used for the lateral control, and, on the other hand, it can be decided, for example according to the type of fault or once the presence of a fault has been detected, to deactivate the functionality linked to the lateral control.

The principles of the invention can nevertheless be applied even in the case where the motor vehicle is not equipped with such a lateral-control assistance system. In this case, there can be provision that the driver can deliberately enter, for example via the user interface 5, into a diagnostic mode when driving, and that the corrective steering wheel angles used by the fault detection module 4 are the steering wheel angles directly applied to the steering wheel of the vehicle by the driver to recenter his vehicle on a rectilinear portion of a traffic lane, and measured by a steering wheel angle sensor.

The invention claimed is:

1. A method for detecting faults related to wheels of a motor vehicle in a driving situation, comprising:
    automatically determining a first series of corrective steering wheel angles successively applied during a first time window of driving said motor vehicle on a first portion of a substantially rectilinear traffic lane, said corrective steering wheel angles being applied so that said vehicle follows a path parallel to said first traffic lane portion;
    automatically detecting a presence of a fault affecting a pair of steered wheels of the motor vehicle, from the corrective steering wheel angles of the first series;
    estimating a type of fault associated with the fault whose presence has been detected;
    identifying the steered wheel of said pair of wheels affected by said fault;
    generating a warning message for an attention of a driver of the motor vehicle, said message comprising the estimated type of fault and the wheel identified as having the fault;
    following a detection of the presence of a fault resulting from the automatic detection, automatically determining a second series of corrective steering wheel angles successively applied during a second time window of driving said motor vehicle on a second traffic lane portion of curved profile, said corrective steering wheel angles being applied so that said vehicle follows a path parallel to said second traffic lane portion; and
    calculating an average on the corrective steering wheel angles of the second series.

2. The method as claimed in claim 1, wherein the automatic detection comprises calculating an average and a standard deviation on the corrective steering wheel angles of the first series.

3. The method as claimed in claim 2, wherein the steered wheel affected by said fault is identified from a sign of the average calculated in the automatic detection.

4. The method as claimed in claim 1, wherein estimating a type of fault comprises calculating time derivatives of the corrective steering wheel angles of said first series, the type of fault being estimated on a basis of a comparison of an average of the time derivatives with respect to zero.

5. The method as claimed in claim 1, wherein the steered wheel affected by said fault is identified from a sign of the average calculated on the corrective angles of the second series.

6. The method as claimed in claim 1, wherein estimating a type of fault comprises calculating a time derivative of the corrective steering wheel angles of said second series, the type of fault being estimated on a basis of a comparison of said time derivative with respect to zero.

7. The method as claimed in claim 1, further comprising: deactivating an on-board driver assistance system capable of commanding a lateral control of the path of the motor vehicle during an activation phase of said on-board driver assistance system.

8. The method as claimed in claim 7, wherein said deactivation is triggered on a basis of the estimated type of fault.

9. The method as claimed in claim 7, wherein the corrective steering wheel angles applied are delivered by said on-board driver assistance system during the activation phase of said on-board driver assistance system.

* * * * *